United States Patent [19]

Breny

[11] Patent Number: 5,437,321

[45] Date of Patent: Aug. 1, 1995

[54] BELT REINFORCING STRUCTURE FOR A PNEUMATIC TIRE

[75] Inventor: Michel Breny, Holzthum, Luxembourg

[73] Assignee: The Goodyear Tire & Rubber Company, Akron, Ohio

[21] Appl. No.: 247,370

[22] Filed: May 23, 1994

Related U.S. Application Data

[63] Continuation-in-part of Ser. No. 52,982, Apr. 27, 1993, abandoned.

[51] Int. Cl.$^6$ ............................ B60C 3/04; B60C 9/20; B60C 9/26
[52] U.S. Cl. ...................................... 152/454; 152/526; 152/528; 152/529; 152/531; 152/533; 152/534; 152/536; 152/538; 152/117
[58] Field of Search ................................. 152/528–529, 152/531, 533–534, 454, 536, 526, 538; 156/117

[56] References Cited

U.S. PATENT DOCUMENTS

5,032,198 6/1991 Kojima et al. .................. 152/531 X
5,111,863 5/1992 Nakasaki .............................. 152/526
5,223,061 6/1993 Navaux .
5,332,018 7/1994 Roesgen et al. ..................... 152/528

FOREIGN PATENT DOCUMENTS

0092498 10/1983 European Pat. Off. .
0479065 4/1992 European Pat. Off. .
62-139702 6/1987 Japan .................................. 152/528
87789 12/1990 Luxembourg .

OTHER PUBLICATIONS

*Mechanics of Pneumatic Tires,* ed. Samuel Clark: US Department of Transportation, Aug. 1981, pp. 630 595–596.

Primary Examiner—Adrienne C. Johnstone
Attorney, Agent, or Firm—David E. Wheeler

[57] ABSTRACT

A pneumatic tire has a belt reinforcing structure comprising a folded belt ply and a spirally wound structure extending transversely between the folded edges of folded portions of the folded belt ply. No cut belts are used in the assembly. In an illustrated embodiment, both the folded belt ply and the spirally wound ply are reinforced with aramid cords. Also, a plurality of spirally wound plies can be used.

8 Claims, 4 Drawing Sheets

BELT REINFORCING STRUCTURE FOR A PNEUMATIC TIRE

This application is a continuation-in-part of U.S. Ser. No. 08/052,982, filed Apr. 27, 1993, now abandoned.

BACKGROUND

The present invention relates to pneumatic automobile tires, for use on paved surfaces, comprising a radial ply carcass, a tread disposed radially outwardly of the crown region of the carcass, a belt assembly interposed between the tread portion and the crown region of the carcass in circumferential surrounding relation to the carcass. The invention relates more specifically to low aspect ratio tires.

Belt assemblies including a folded ply are well known in the art. In one prior art embodiment the folded ply is reinforced with cords of high modulus material and has an overall width at least equal to that of the tread. Each of its lateral sides is folded back in a radially outward direction, around two unfolded—so-called single cut—plies. The reinforcing cords of the folded ply form an angle of 20 to 60 degrees, and those of the two single cut plies form opposed angles, respectively of 15 to 28 and −15 to −28 degrees, all with respect to the equatorial plane of the tire. Tires comprising folded plies in their crown region have been found to be particularly durable when subjected to high revolution speeds. They have also improved resistance to separations at the axial edges of a belt assembly.

EP-A-92 498 discloses a first tread reinforcing ply folded around a second tread reinforcing ply, such that the first ply envelops the second ply. The reinforcing cords of the first ply form an angle of 20 to 60 degrees and those of the second ply form an angle of 0 to 10 degrees with respect to the equatorial plane of the tire.

LU 85 964 describes a tire having an overlay structure disposed radially outwardly of the belt assembly. Helical convolutions of a ribbon are wound axially across two single cut plies such that the convolutions are in abutting contact with each other. The ribbon is reinforced with cords of textile material. An overlay structure wherein the helical convolutions overlap is for instance disclosed in EP 333 628. Tires having such an overlay structure in their crown region have excellent high speed properties but are expensive to manufacture.

The present invention has an object to provide a pneumatic tire which is durable at high speeds.

A further object is to provide a tire which has fewer components, less weight, and at the same time has a high degree of uniformity.

Other objects of the invention will be apparent from the following description and claims.

SUMMARY OF THE INVENTION

The present invention provides a pneumatic automobile tire having an aspect ratio below 65, comprising a carcass of at least one radial ply, a tread disposed radially outward of the crown region of the carcass, a belt assembly having an overall width substantially equal to the tread width (TW), interposed between the tread and the crown region in circumferential surrounding relation to the carcass. The belt assembly comprises a belt ply having folded portions having a width W on each lateral side. The belt ply is reinforced with reinforcement cords extending parallel to one another and making an angle of 60° to 75° with respect to the equatorial plane (EP) of the tire. The axially outer portions of the ply are folded in a radially outward direction, and a reinforcing structure including at least one spirally wound strip, extends substantially transversely between the folded edges of the folded portions of the belt ply. The at least one spirally wound strip is made from elastomeric material reinforced by textile cords and forms at least one annular layer; the cords make an angle of 0° to 5° with respect to the equatorial plane (EP) of the tire.

Such a tire has low ply steer (ply steer is a force component which changes direction with reverse rotation, when measuring the tire lateral force variations), a uniform treadwear when operated at high speed, low rolling resistance at high speed as well as an excellent high speed performance.

DETAILED DESCRIPTION OF THE INVENTION

Figure 1:
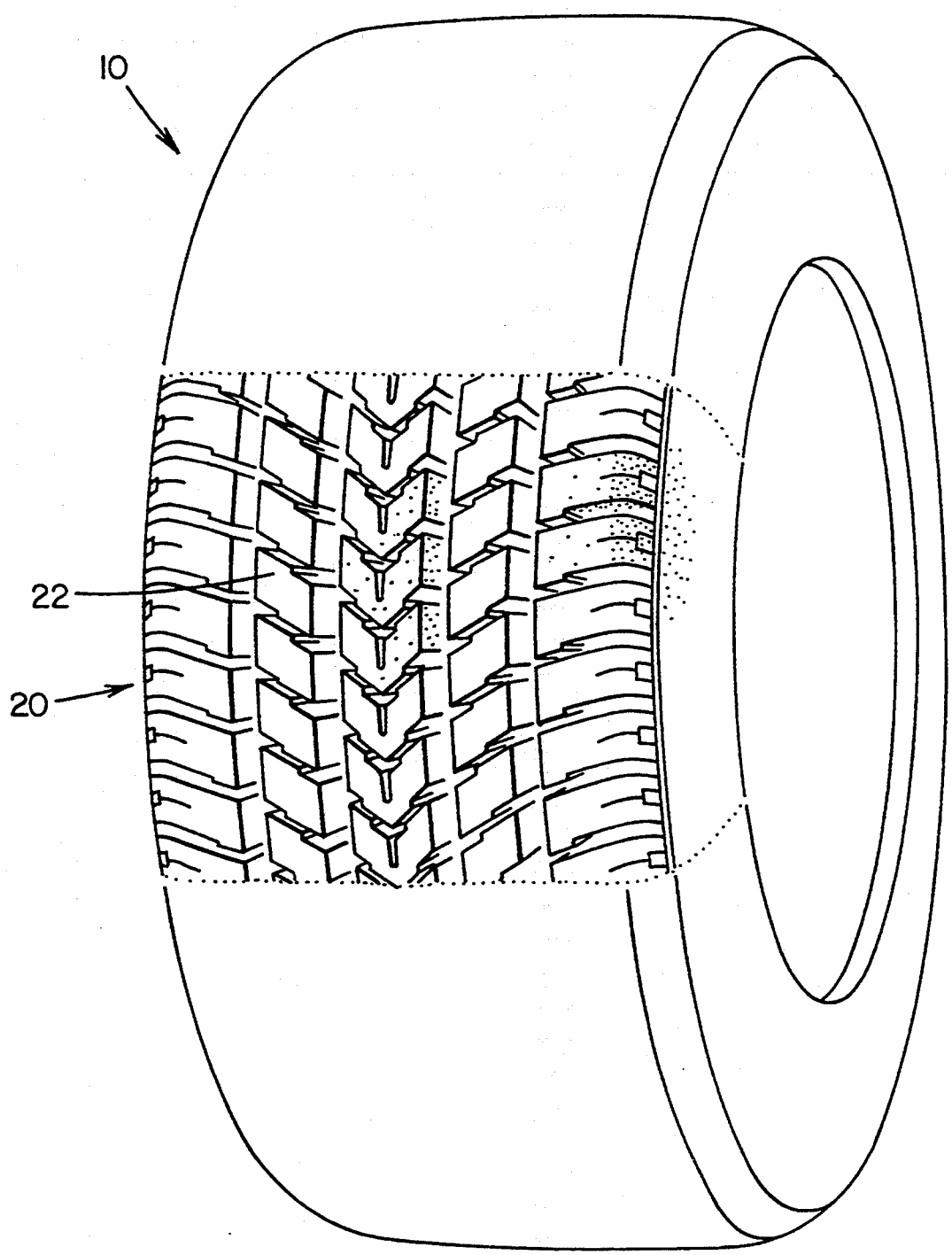
FIG. 1 is a perspective view of a pneumatic tire made in accordance with the present invention.
Figure 2:
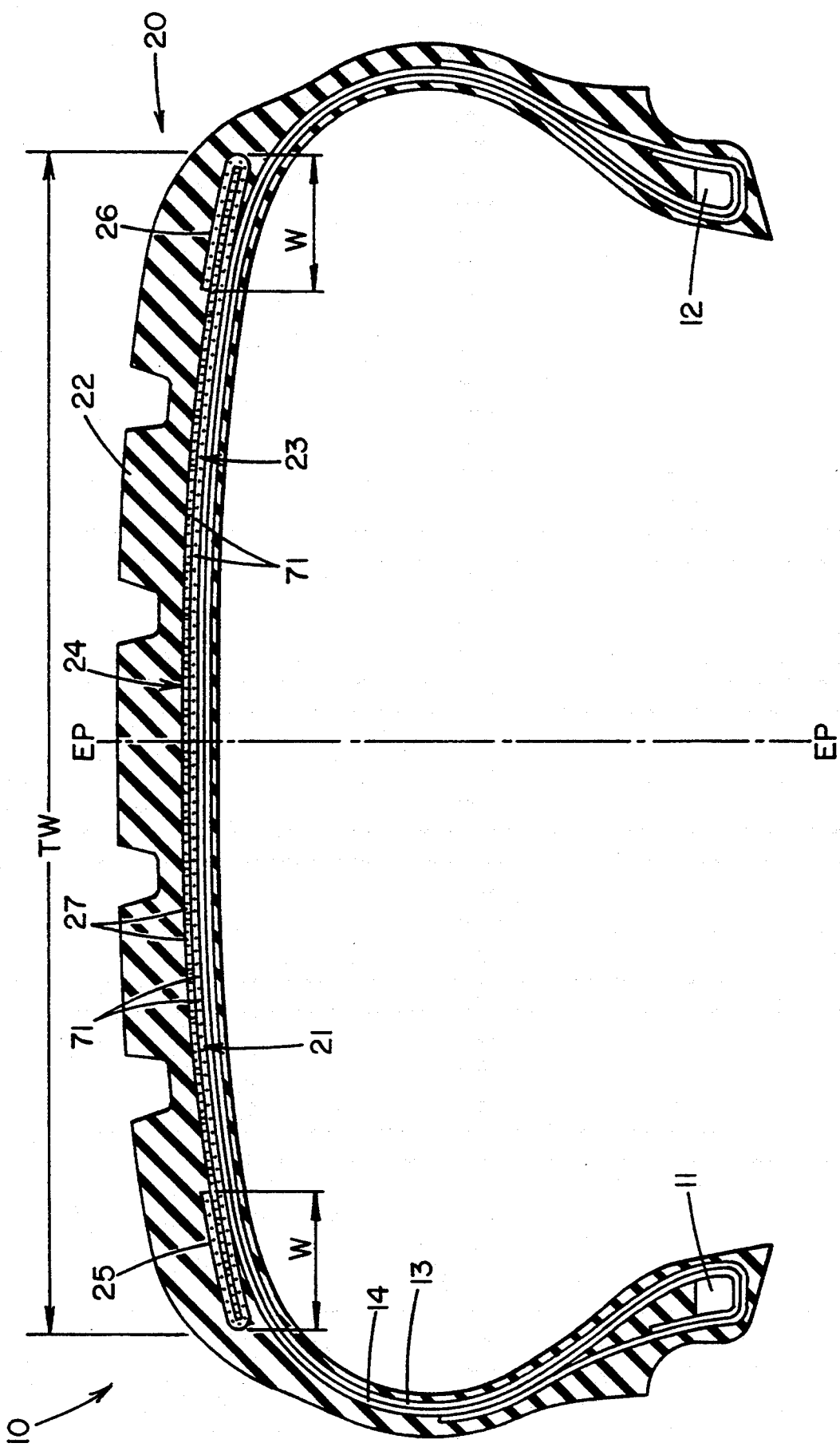
FIG. 2 is a cross-sectional view of the tire shown in FIG. 1.

With reference to FIGS. 1 and 2, there is represented a low aspect ratio radial carcass pneumatic automobile tire 10 having a pair of substantially inextensible bead cores 11, 12 which are axially spaced apart with two radial carcass plies 13, 14 extending between the bead cores. The carcass plies are folded axially and radially outwardly about each of the bead cores and are reinforced by cords which are substantially parallel to each other in the same ply, and make an angle of 70° to 90° with respect to the equatorial plane (EP) of the tire. Cords belonging to adjacent carcass plies cross each other at an angle of at least 1 degree, and preferably an angle of 2 to 5 degrees. This crossing of the cords in the two plies prevents a cord from one carcass ply from slipping between a cord of an adjacent carcass ply during the shaping of the tire in the manufacturing process. The cords of the carcass plies 13, 14 can be of any suitable material as for example steel, nylon, rayon, aramid or polyester.

In an illustrated embodiment, the aspect ratio of tire 10 is 25 to 65 and may be below 60, preferably 25-60.

As used herein and in the claims, the "equatorial plane" of the tire (EP) is a plane that is perpendicular to the axis of rotation of the tire and passes through the center of the tire tread, the terms "axial" and "axially" refer to lines or directions which are parallel to the axis of rotation of the tire and the terms "radial" and "radially" refer to directions that are radially toward or away from the axis of rotation of the tire. "Tread width" TW of the tire means the length of the tread surface in the axial direction, that is, in a plane passing through the axis of rotation of the tire. "Aspect ratio" of the tire means the ratio of its section height —i.e. the radial distance from the nominal rim diameter to the maximum outer diameter of the tire nearest its equatorial plane— to its section width —i.e. the maximum axial distance between the exterior of the tire sidewalls when unloaded and inflated at normal pressure—, multiplied by 100% for expression as a percentage. By low aspect ratio is meant a tire having an aspect ratio of 65 and below.

As is illustrated in FIG. 2, the crown area 20 of the tire 10 is reinforced by a belt assembly 21 located radially inwardly of the tire tread 22. The belt assembly is essentially rigid and comprises a folded ply 23 and a spirally wound structure 24.

The folded ply 23 is reinforced by cords having a high modulus such as for example rayon, aramid or carbon-fiber. High modulus materials, like aramid (80,000 MPa) or rayon (18,000 MPa), are furthermore advantageous in high speed tires in view of their dimensional stability.

As used herein, "aramid" and "aromatic polyamide" are both understood to mean a manufactured fiber in which the fiber-forming substance is generally recognized as a long chain synthetic aromatic polyamide in which at least 85% of the amide linkages are attached directly to the two aromatic rings. Representative of an aramid or aromatic polyamide is a poly (p- phenyleneterephthalamide).

The cords of the folded ply 23 are substantially parallel to each other and make an angle of 60° to 75° with respect to the equatorial plane (EP) of the tire. The axially outer portions of the ply 23 are folded back on both lateral sides in a radially outward direction on each side of the spirally wound structure 24, the folded portions 25 and 26 being preferably symmetrical with respect to the equatorial plane. The folded portions 25 and 26 may each have a transverse width W equal to 5% to 30%, preferably 15% to 30% of the tread width (TW). In the designing of a tire of the invention, it is preferred that the end portions of the folds 25 and 26 be located radially inwardly of, or adjacent to, a circumferentially extending groove 28 of the tread pattern.

The spirally wound structure 24 extends transversely between the folded edges of the folded portions 25 and 26 and consists of a spirally wound strip 27, made from elastomeric material reinforced by cords of an aromatic polyamide. Other textile materials, such as rayon or polyester can be used. It is desirable that the material used has low heat shrinkage properties for uniformity reasons. The spiral convolutions of the strip 27 make an angle of 0° to 5° with respect to the equatorial plane (EP) and are in abutment with any adjacent convolution, so as to form a continuous annular ring having a substantially even cord distribution across the axial width of the structure 24. The strip has a thickness of about 1 mm and a width of 5 to 25 mm, and more preferably 7 to 15 mm, and a lateral cord distribution density of at least 15 EPI (ends per inch), preferably at least 20 EPI, and more preferably 25 to 35 EPI.

Although the spirally wound structure 24 shown in FIG. 2 has only one annular layer, the structure 24 could also include a second annular layer (not shown) located adjacent to and radially outward of the first annular layer. Preferably, the second layer would have its spiral convolutions wound on the opposite hand as compared to the winding of the first annular layer, so that the cords of each layer cross at a very small angle. With such a construction, the two layers could be wound continuously, in succession, without a break in the ribbon.

Figure 3:
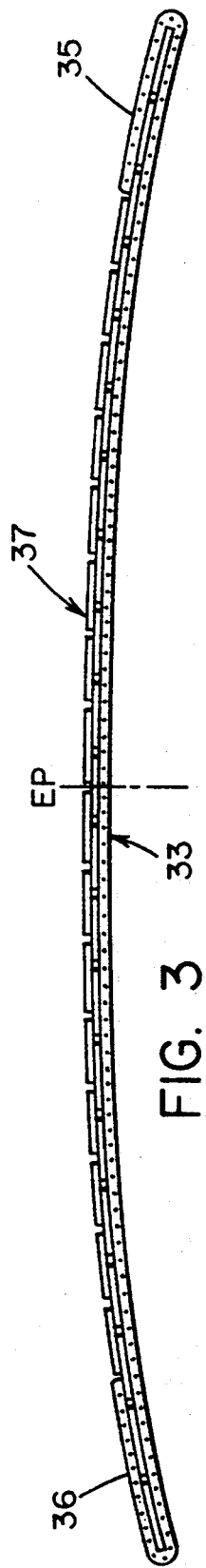
FIGS. 3 to 6 are schematic representations of alternate embodiments of the belt assembly.

FIG. 3 illustrates an alternative to the belt structure shown in FIG. 2, wherein the spiral convolutions of the strip 37 are not in abutment with adjacent convolutions. There are two layers of spiral convolutions between the end portions of the two folds and one layer only under the folded portions 35 and 36 of the folded ply 33. Such a structure shows an increased restrictive effect near the equatorial plane of the tire and the wear balance of the tire is improved.

Figure 4:
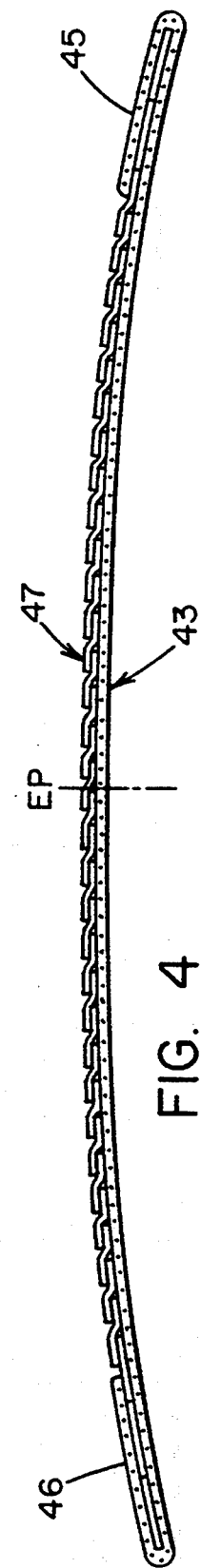

FIG. 4 illustrates a further embodiment of a belt structure according to the invention, wherein adjacent convolutions of the strip 47 have an overlapping relationship with one another between the end portions of the two folds and are in abutment with adjacent convolutions under the folded portions 45 and 46 of the folded ply 43. By varying the amount of overlap between adjacent convolutions, different cord densities are possible throughout the axial extent of the reinforcement zone. The strip can be applied in one single operation, and those skilled in the art will recognize that the amount of overlap of the spiral convolutions need not be uniform.

In any case, it is preferred that the variable concentrations of reinforcement material be symmetrical with respect to the equatorial plane EP of the tire.

Figure 5:
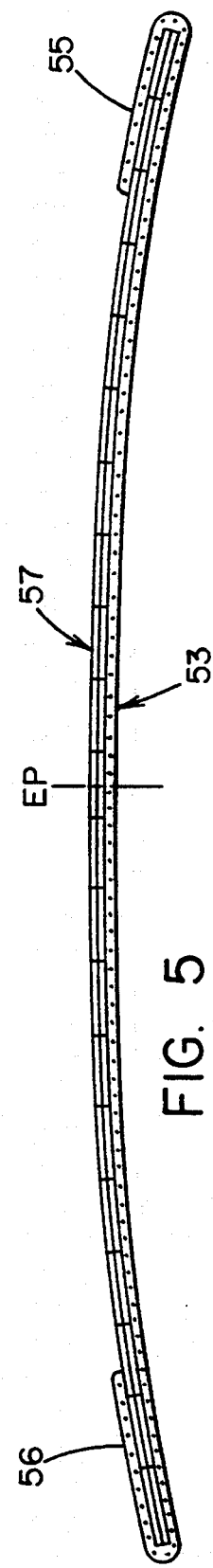
Figure 6:
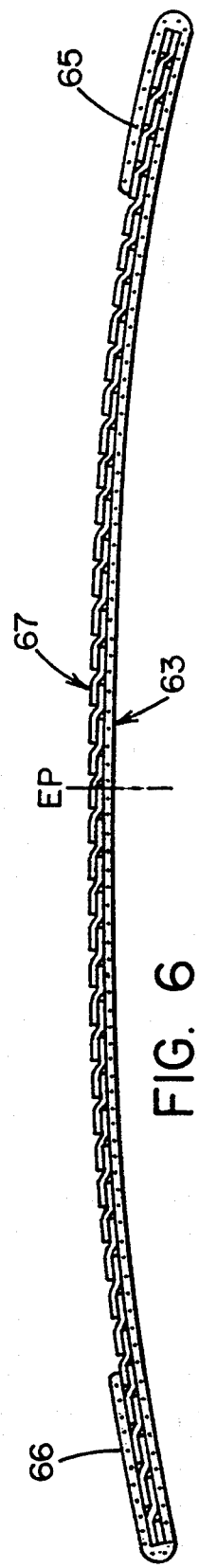

FIG. 5 illustrates an alternative to the belt structure shown in FIG. 3. Each spiral convolution of the strip 57 is in abutment with an adjacent convolution, and there are two layers of spiral convolutions between the outermost edges of the folded portions 55 and 56 of the folded ply 53. A similar-two layer-reinforcing strip 67 can be obtained by overlapping half of the strip's width over an adjacent convolution, between the outermost edges of the folded portions 65 and 66 of the folded ply 63 as shown on FIG. 6. The embodiments shown in FIGS. 5 and 6 are of interest for extremely large sized tires such as 335/35R17.

Figure 7:
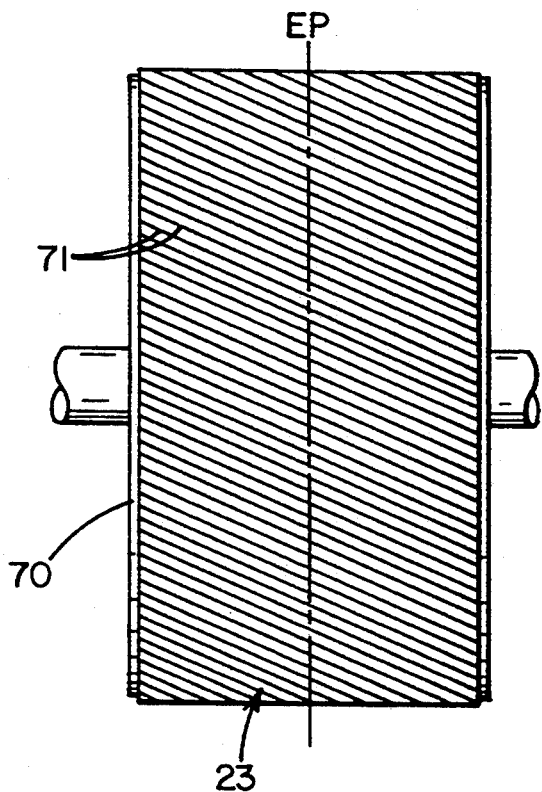
FIGS. 7 to 9 are schematic representations of the belt assembly in subsequent building steps.
Figure 8:
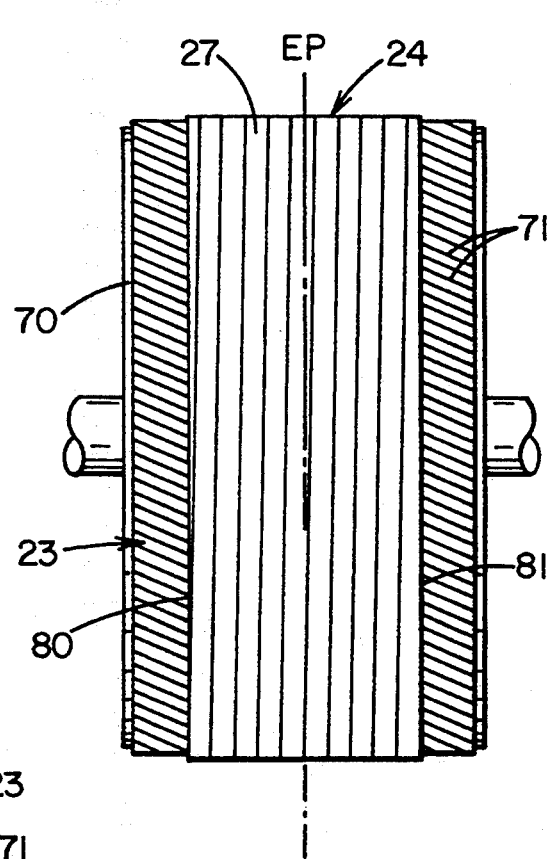
Figure 9:
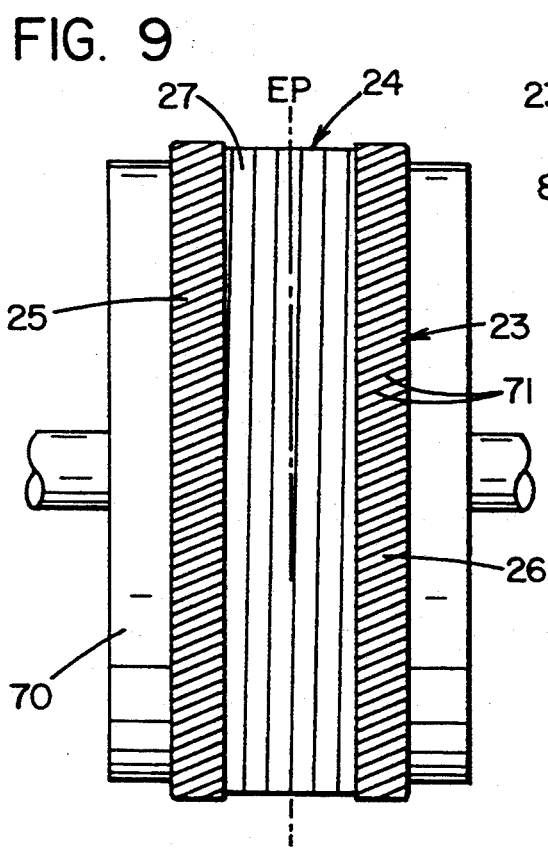

Referring to FIGS. 7 to 9, building steps for the tire represented in FIG. 2 are shown schematically, the ply 23 is represented in FIG. 7 after being positioned on a flat building drum 70 (other parts of the tire and details of the drum are not shown). The angles formed by the reinforcing elements 71 with respect to the equatorial plane EP are 60 to 70 degrees, an angle of 67 degrees being shown in FIG. 7.

Before the operation of folding the belt, an annular layer 27 is spirally wound from the left hand axial edge 80 towards the right hand axial edge 81 (FIG. 8), but could just as well be wound by starting from the other axial edge. In the illustrated embodiment, the drum 70 is continuously rotated, and the ribbon wound on the middle portion of the ply 23, with a lateral displacement speed chosen so that each helical convolution is in abutment with neighboring convolutions. The spiral convolutions firmly compress ply 23 against carcass plies 13 and 14 (not shown).

It is well known in the tire art that the spiral convolutions of a tire built on a straight cylindrical drum are subjected to different elongations during the shaping and vulcanizing step of the tire manufacturing process because the expansion of the tire is greater in the center portion than in the shoulder portions of the belt reinforcing structure. In order to minimize the resulting differences in the stresses of the strip, it is preferable to wind the strip in the belt center with a very small winding tension as compared to the winding tension used when making the tire shoulder portion. Alternatively, the surface of the cylindrical drum upon which the strip is spirally wound can be given a slightly convex shape. This convex shape can be made to conform as closely as possible to the radial shape of the overlay ply in the finished tire, so as to obtain a minimal stretch differential between the center and shoulder portions of the overlay strip during shaping and curing. In such a case, the belt assembly will be somewhat wider than the treadwidth, and in such an illustrated embodiment, the width of the belt assembly is in the order of 108% to 112% of the treadwidth.

After the application of the annular layer 27, the belt can be folded. Because the annular layer exerts a restricting effect, it is easier to obtain fold edges that are uniform. To obtain an even better edge uniformity, the layer 23 can be prefolded, and flattened again, before being applied on the building drum. As is illustrated in FIG. 9, in the illustrated embodiment, the reinforcement elements of the folded parts form angles of about 23 degrees with respect to the equatorial plane (EP) of the tire.

In an alternative embodiment, not shown, the spiral convolutions of the spirally wound strip have an overlapping relationship under the folded portion of the belt ply, and are in abutment between the folded portions.

The benefits of the present invention become apparent from a comparison test which has been made between a conventional tire "A", having crown reinforcement comprising two single cut steel breaker plies under two turns of spirally wound overlay, and a tire "B", made according to the invention which has a spirally wound structure reinforced with 1,000/2 Denier aramid cords at a density of 30 EPI between a folded ply reinforced with 1500/3 Denier aramid cords, having a density of 20 EPI. The reinforcing cords in the spirally wound structure have, in a homogeneous specimen, a Young's modulus of at least 40,000 MPa. The aramid cords of the folded ply form an angle of about 67 degrees with respect to the equatorial plane, and the spirally wound structure is as shown on FIG. 2. Within each tire series "A" and "B", all the other constructional details of the tire have been kept the same, within the usual manufacturing tolerances. Tires having the size 235/45R17 gave the following results, wherein the data obtained from the tire series "B" have been standardized against the data from tire series "A", i.e. the "A" tires have been given the value 100, and the data from the "B" tires have been related thereto (i.e. a normalization based on the tires "A"):

| High speed performance | |
| --- | --- |
| A | B |
| 100 | 116 |

The high speed performance data have been derived from conventional high speed endurance tests run under the same conditions. The conventional high speed endurance tests consist of subjecting the tire to revolution speeds that gradually increase by steps of 10 km/h. The tire which is inflated to its design pressure is pressed against a drum with a force equivalent to its design load, and the tire is then rotated with the drum for ten minutes at each of a series of increasing speed steps. The tire's high speed endurance is measured by the highest speed step that it can sustain during a given interval without being destroyed.

The "B" tires according to the invention have, at low speed a slightly higher rolling resistance (e.g. 97 at a speed of 60 km/h) than the "A" tires; at a speed of about 120 km/h, the rolling resistances are about equal, and at higher speeds a lower rolling resistance (126 at a speed of 160 km/h) can be measured.

It will be apparent that changes may be made in the positioning of the spiral convolutions, in the extent of overlap or axial variation of overlap of the spirally wound strip. The spirally wound strip could also form a second or a third layer, superimposed on the previously wound layer(s), so as to extend at least partially across its/their width(s). The embodiments of the invention described above should be considered as illustrative and not as limiting the scope of the invention as defined in the following claims.

I claim:

1. A pneumatic automobile tire having an aspect ratio below 60, comprising a carcass of at least one radial ply, a tread disposed radially outward of the crown region of the carcass, a belt assembly having an overall width substantially equal to the tread width (TW) interposed between the tread and the crown region in circumferential surrounding relation to the carcass, wherein the belt assembly consists essentially of a belt ply having folded portions on each lateral side, being reinforced with reinforcement cords extending parallel to one another and making an angle of 60° to 75° with respect to the equatorial plane (EP) of the tire, the axially outer portions of the ply being folded in a radially outward direction; and a spirally wound structure extending substantially transversely between the folded edges of the folded portions of said belt ply, consisting of at least one spirally wound strip, said at least one spirally wound strip being made from elastomeric material reinforced by textile cords and forming at least one annular layer, the cords making an angle of 0° to 5° with respect to the equatorial plane (EP) of the tire and wherein the spirally wound structure is reinforced with cords of a textile material having on a homogeneous specimen a Young's modulus of at least 40,000 MPa.

2. A pneumatic tire according to claim 1 wherein the folded portions each have a transverse width 5% to 30% of the tread width (TW).

3. A pneumatic tire according to claim 1 wherein the spirally wound structure includes one annular layer of spiral convolutions, adjacent convolutions being in abutment with each other.

4. A pneumatic tire according to claim 1 wherein spiral convolutions of the at least one spirally wound strip have an overlapping relationship with adjacent convolutions.

5. A pneumatic tire according to claim 1 wherein at least some spiral convolutions of the at least one spirally wound strip have an overlapping relationship with adjacent convolutions.

6. A pneumatic tire according to claim 5 wherein the spiral convolutions of the at least one spirally wound strip are in abutment with the adjacent convolutions under the folded portions of the belt ply, and have an overlapping relationship between the ends of the folded portions.

7. A pneumatic tire according to claim 1 wherein the spirally wound structure is reinforced with cords of aromatic polyamide.

8. A pneumatic tire according to claim 1 wherein the spirally wound structure is reinforced with cords having a lateral density of at least 20 ends per inch.

* * * * *